United States Patent
Tawada

(10) Patent No.: US 10,939,224 B2
(45) Date of Patent: Mar. 2, 2021

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Noriaki Tawada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/821,419

(22) Filed: Mar. 17, 2020

(65) Prior Publication Data

US 2020/0314581 A1    Oct. 1, 2020

(30) Foreign Application Priority Data

Mar. 28, 2019  (JP) .............. JP2019-064366

(51) Int. Cl.

| | |
|---|---|
| H04S 7/00 | (2006.01) |
| G06F 3/16 | (2006.01) |
| H04R 1/40 | (2006.01) |
| H04R 3/00 | (2006.01) |
| H04S 3/00 | (2006.01) |
| G10L 25/24 | (2013.01) |
| G10L 25/06 | (2013.01) |

(52) U.S. Cl.
CPC .............. *H04S 7/303* (2013.01); *G06F 3/165* (2013.01); *G10L 25/06* (2013.01); *G10L 25/24* (2013.01); *H04R 1/406* (2013.01); *H04R 3/005* (2013.01); *H04S 3/008* (2013.01); *H04S 2400/01* (2013.01); *H04S 2400/11* (2013.01); *H04S 2400/15* (2013.01)

(58) Field of Classification Search
CPC ...... H04S 7/303; H04S 3/008; H04S 2400/01; H04S 2400/11; H04S 2400/15; G06F 3/165; G10L 25/06; G10L 25/24; H04R 1/406; H04R 3/005

See application file for complete search history.

(56) References Cited

FOREIGN PATENT DOCUMENTS

JP    2005-223771 A    8/2005

OTHER PUBLICATIONS

English machine translation of JP 2005-223771 A (Fujita et al., Surround Sound Mixing Apparatus and Program for the Same, published Aug. 2005) (Year: 2005).*

* cited by examiner

*Primary Examiner* — Mark Fischer
(74) *Attorney, Agent, or Firm* — Canon U.S.A., Inc. IP Division

(57) ABSTRACT

An information processing apparatus includes a data acquisition unit to acquire pieces of acoustic data based on sound collection performed by sound collection units at different positions, a setting unit configured to set a virtual sound source position corresponding to a piece of acquired acoustic data for each acquired piece, based on a sound collection position and correlation information indicating a correlation between the piece of acoustic data and another piece of acoustic data, the virtual sound source position set so an imbalance between virtual sound source positions respectively corresponding to the pieces of acoustic data is smaller than an imbalance between sound collection positions, and a generation unit configured to generate audio playback data for reproducing a sound for a virtual listening position, by processing piece(s) of acquired acoustic data based on the virtual listening position and the virtual sound source positions set by the setting unit.

19 Claims, 5 Drawing Sheets

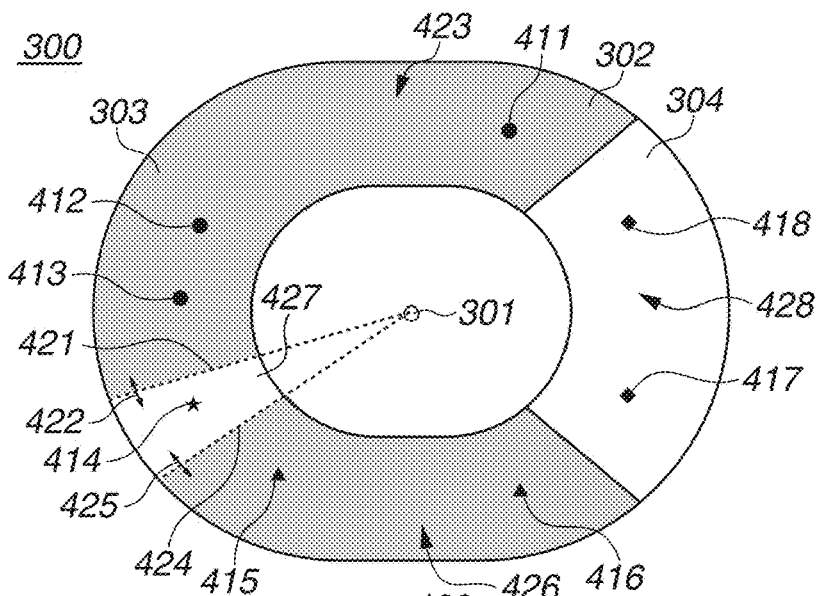
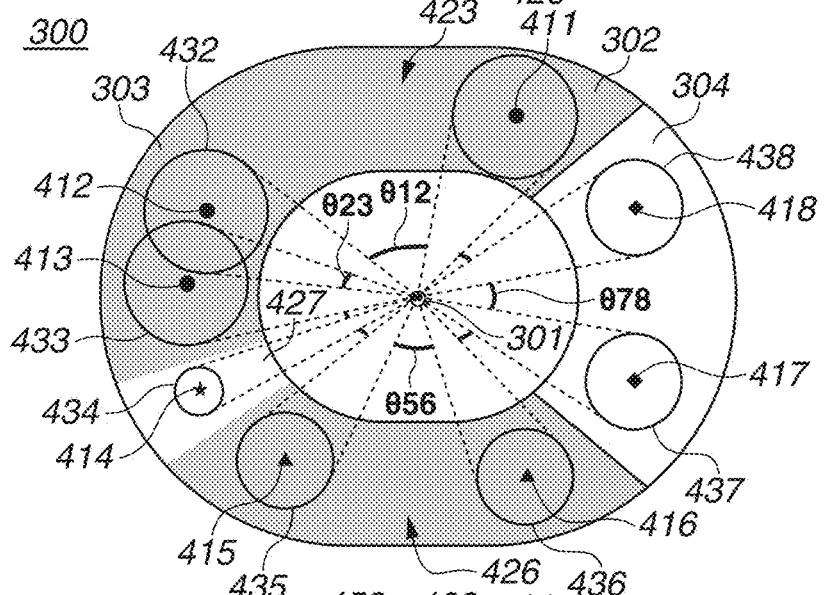
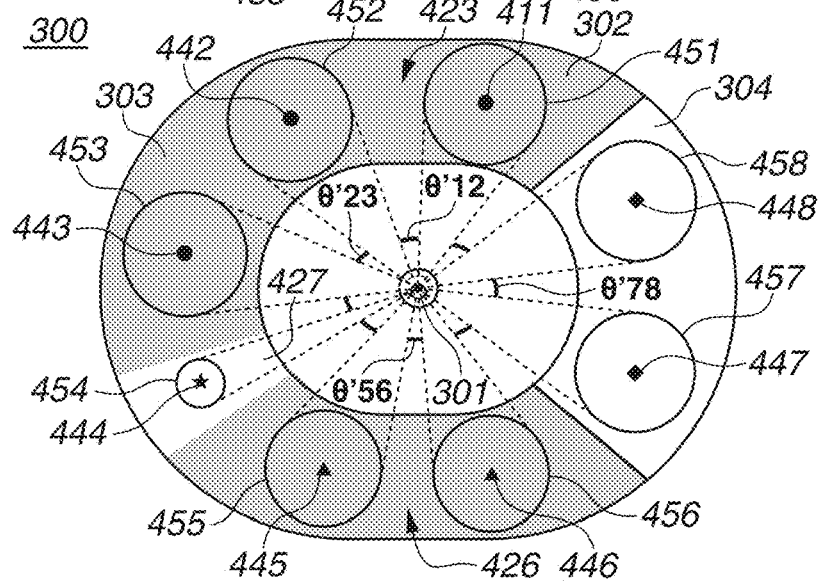

INFORMATION PROCESSING APPARATUS, INFORMATION PROCESSING METHOD, AND STORAGE MEDIUM

BACKGROUND

Field

The present disclosure relates to a technique for processing acoustic data obtained by collecting a sound.

Description of the Related Art

Audio playback data for reproducing a sound collected in a sound collection target space can be generated in such a manner that microphones are arranged at different positions in the sound collection target space, a sound is collected by each of the microphones, and a plurality of pieces of acoustic data obtained by the microphones is synthesized based on sound collection positions of the microphones. For example, a plurality of pieces of acoustic data obtained by a plurality of microphones arranged in a stadium is acquired as audio data from sound sources located at the sound collection positions of the microphones, respectively, and the center of the stadium is set as a virtual listening position. Each piece of acoustic data is processed by a surround panning technique or the like based on a positional relationship between the position of corresponding sound source and a listening position, whereby an acoustic signal for surround reproduction can be generated. By reproducing the acoustic signal using a surround reproduction system, a user who listens to the reproduced sound can perceive an image with sound causing the user to feel as if the user is located at the center of the stadium.

Japanese Patent Application Laid-Open No. 2005-223771 discusses a technique for producing a surround sound for a listener by performing mixing processing, on a sound collected by a plurality of microphones installed at different positions, based on an. installation position of each microphone and an input listening position.

SUMMARY

According to an aspect of the present disclosure, it has now been determined that in the case of generating audio playback data by a related-art method based on acoustic data obtained by collecting a sound at a plurality of positions, the sound reproduced based on the audio playback data may produce a sound less realistic for the user, depending on the arrangement of the sound collection positions. For example, microphones may be arranged in an imbalanced manner due to constraints of a stadium used as a sound collection target. In this case, if data generated by synthesizing acoustic data obtained by collecting sounds based on the arrangement of microphones is reproduced, a sound from a direction in which no microphones are arranged as viewed from a listening position is hardly heard. As a result, for example, a cheering sound all over the stadium cannot be fully reproduced. If data generated by synthesizing acoustic data obtained by collecting sounds regardless of the arrangement of microphones is reproduced, a local cheering sound or the like can be heard from a direction different from the direction in which the cheering sound is actually produced, which may cause the user to feel strangeness.

According to another aspect of the present disclosure, an information processing apparatus includes a data acquisition unit configured to acquire a plurality of pieces of acoustic data based on sound collection performed by a plurality of sound collection units each configured to collect a sound at a different position, a setting unit configured to set a virtual sound source position corresponding to a piece of acoustic data acquired by the data acquisition unit, based on a sound collection position of a sound collection unit for acquiring the piece of acoustic data and correlation information indicating a correlation between the piece of acoustic data, the virtual sound source position set such that an imbalance between a plurality of virtual sound source positions respectively corresponding to the plurality of pieces of acoustic data is smaller than an imbalance between sound collection positions of the plurality of sound collection units, and a generation unit configured to generate audio playback data for reproducing a sound for a virtual listening position, by processing at least one of the plurality of pieces of acoustic data acquired by the data acquisition unit based on the virtual listening position and the virtual sound source positions set by the setting unit.

Further features of the present disclosure will become apparent from the following description of exemplary embodiments with reference to the attached drawings.

BRIEF DESCRIPTION OF THE DRAWINGS

FIGS. 4A, 4B, and 4C are diagrams each illustrating optimization of the position and radius of each sound source.

DESCRIPTION OF THE EMBODIMENTS

Figure 1:
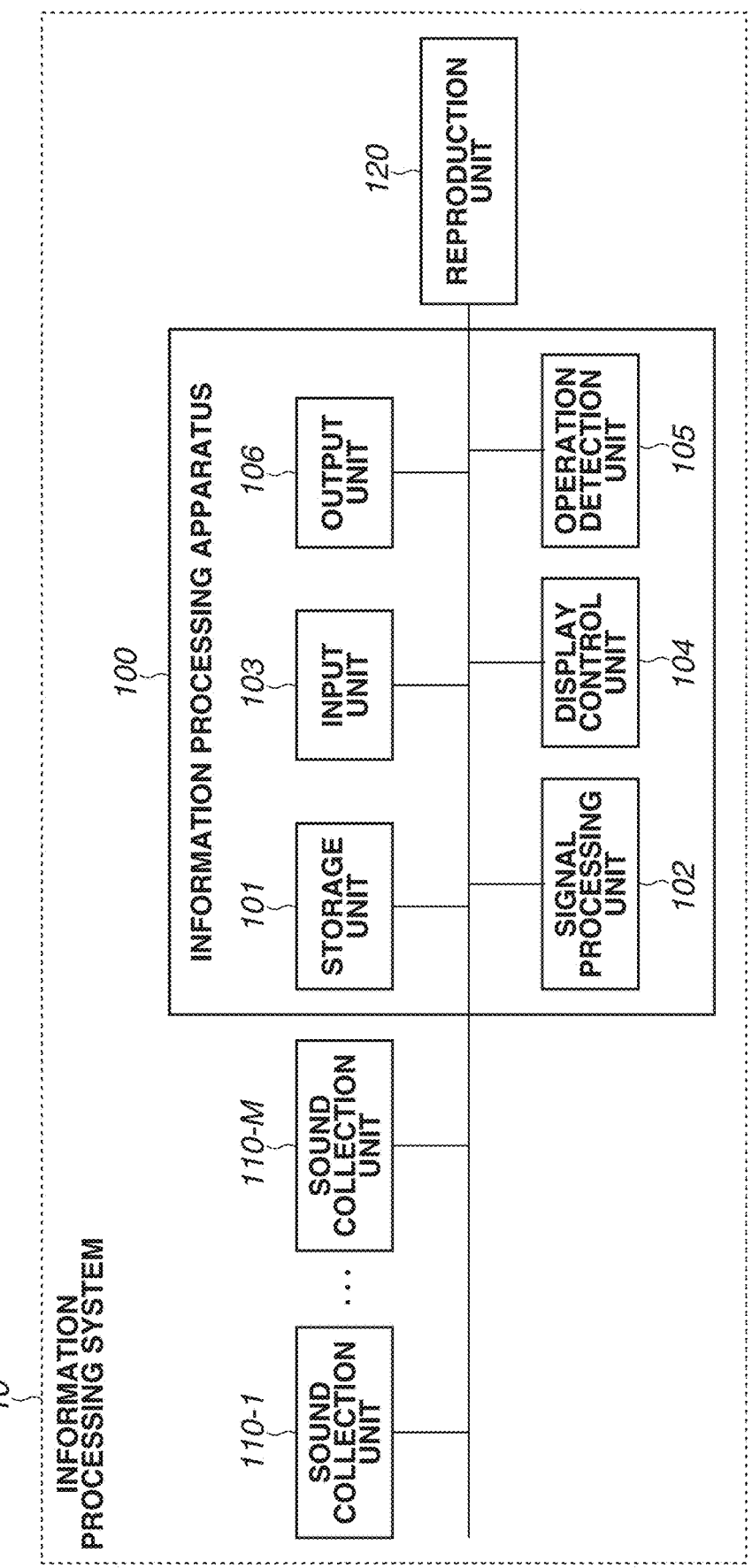
FIG. 1 is a block diagram illustrating a configuration example of an information processing system.

Exemplary embodiments of the present disclosure will be described below with reference to the accompanying drawings. The following exemplary embodiments do not limit the present disclosure. Further, not all combinations of features described in the exemplary embodiments are essential for solving means of the present disclosure. The same components are denoted by the same reference numerals.

[System Configuration]

FIG. 1 is a block diagram illustrating a configuration example of an information processing system 10 according to an exemplary embodiment of the present disclosure. The information processing system 10 includes an information processing apparatus 100, M sound collection units, i.e., sound collection units 110-1 to 110-M, and a reproduction unit 120. If there is no need to distinguish the sound collection units 110-1 to 110-M, each of the sound collection units 110-1 to 110-M is hereinafter referred to simply as the sound collection unit 110. The information processing system 10 may include a plurality of sound collection units 110, and the number of sound collection units 110 is not particularly limited. The plurality of sound collection units 110 may have the same configuration, or may have different configurations.

Each sound collection unit 110 is a microphone including a single microphone element, or a microphone array including a plurality of microphone elements. The plurality of sound collection units 110 is arranged at different positions. The present exemplary embodiment illustrates an example where the plurality of sound collection units 110 is arranged in a stadium in which a sports event is held and a sound from a spectator stand in the stadium is collected. However, a sound to be collected by the sound collection units 110 is not limited to a sound from a spectator stand, but instead may be a sound emitted from a player and the like in a play field. A location where each of the sound collection units 110 is installed is not limited to a stadium, but instead may be, for example, a concert hall or a stage. A sound collection signal obtained based on sound collection performed by the sound collection unit 110 is output to the information processing apparatus 100.

Figure 5:
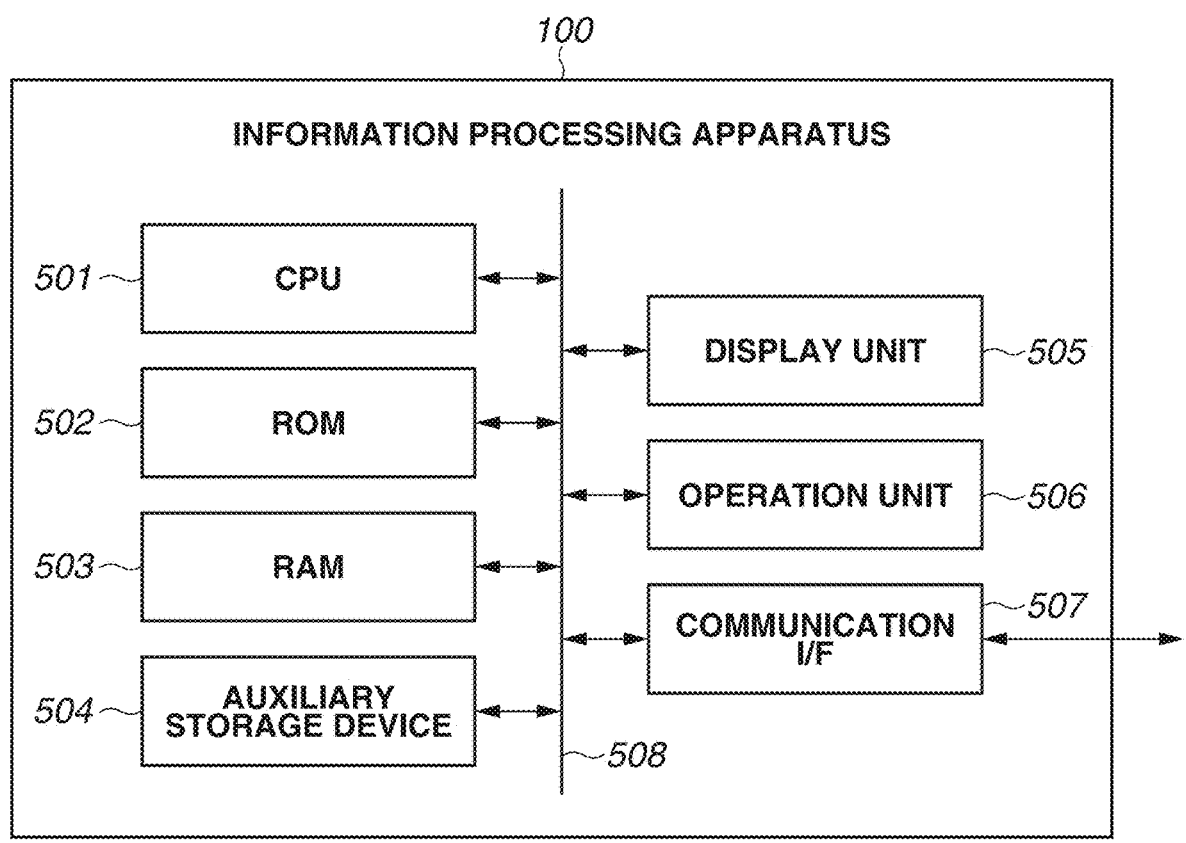
FIG. 5 is a block diagram illustrating a hardware configuration example of the information processing apparatus.

The information processing apparatus 100 processes acoustic data corresponding to the sound collection signal input from the sound collection units 110 based on information about sound sources to be described below, generating audio playback data, and a reproduction signal corresponding to the generated data is output to the reproduction unit 120. A hardware configuration example of the information processing apparatus 100 will be described with reference to FIG. 5. The information processing apparatus 100 includes a central processing unit (CPU) 501, a read-only memory (ROM) 502, a random access memory (RAM) 503, an auxiliary storage device 504, a display unit 505, an operation unit 506, a communication interface (I/F) 507, and a bus 508.

The CPU 501 controls an overall operation of the information processing apparatus 100 by using computer programs and data stored in the ROM 502 and the RAM 503. The information processing apparatus 100 may include one or more pieces of dedicated hardware different from the CPU 501, and the dedicated hardware may execute at least a part of processing to be performed by the CPU 501. Examples of the dedicated hardware include an application specific integrated circuit (ASIC), a field-programmable gate array (FPGA), and a digital signal processor (DSP). The ROM 502 stores programs and parameters which require no change. The RAM 503 temporarily stores programs and data supplied from the auxiliary storage device 504, and data and the like supplied from an external apparatus via the communication I/F 507. The auxiliary storage device 504 includes, for example, a hard disk drive, and stores various content data such as an acoustic signal.

The display unit 505 includes, for example, a liquid crystal display or a light-emitting diode (LED), and displays a graphical user interface (GUI) and the like that is used for a user to operate the information processing apparatus 100. The operation unit 506 includes a keyboard, a mouse, and a touch panel. The operation unit 506 receives an operation performed by the user and inputs various instructions to the CPU 501. The communication I/F 507 is used for communication with external apparatuses such as the sound collection units 110 and the reproduction unit 120. For example, in a case where wired connection is used between the information processing apparatus 100 and an external apparatus, a communication cable is connected to the communication I/F 507. In a case where the information processing apparatus 100 includes a function for wirelessly communicating with an external apparatus, the communication I/F 507 includes an antenna. The bus 508 connects the units of the information processing apparatus 100 and transmits information to each unit As illustrated in FIG. 1, the information processing apparatus 100 includes, as functional components of the information processing apparatus 100, a storage unit 101, a signal processing unit 102, an input unit 103, a display control unit 104, an output unit 106, and an operation detection unit 105. These functional units are implemented by hardware components illustrated in FIG. 5. The input unit 103 receives an input from the sound collection unit 110 and stores acoustic data based on sound collection in the storage unit 101. The acoustic data stored in the storage unit 101 may be data on the sound collection signal input from the sound collection units 110, or may be data obtained by performing processing, such as noise reduction, on the sound collection signal. The storage unit 101 also stores various information about sound collection, such as a position, a type, and the like of each of the plurality of sound collection units 110.

The signal processing unit 102 performs various processes, which are described below, on the acoustic data stored in the storage unit 101, and generates audio playback data to be used for the reproduction unit 120 to reproduce a sound. The display control unit 104 causes the display unit 505 to display various information. The operation detection unit 105 detects a user operation input via the operation unit 506. The output unit 106 outputs a reproduction acoustic signal to the reproduction unit 120. The acoustic signal output from the output unit 106 may be a signal indicating the audio playback data generated by the signal processing unit 102, or may be a signal obtained by performing processing, such as format conversion, on the audio playback data.

The reproduction unit 120 includes, for example, a surround speaker system or a headphone including a plurality of speakers, and reproduces a sound based on the acoustic signal received from the information processing apparatus 100. In particular, the reproduction unit 120 according to the present exemplary embodiment causes the user to feel a sound coming from a plurality of directions, achieving a stereophonic effect. The reproduction unit 120 may include a function for performing a digital-to-analog (DA) conversion or amplification processing on the acoustic signal received from the information processing apparatus 100.

FIG. 1 illustrates an example where each sound collection unit 110 and the information processing apparatus 100 are directly connected and the information processing apparatus 100 and the reproduction unit 120 are directly connected. However, the configuration of the information processing system 10 is not limited to this example. For example, acoustic data obtained based on sound collection performed by the sound collection units 110 may be stored in a storage device (not illustrated) which can be connected to the information processing apparatus 100, and the information processing apparatus 100 may acquire the acoustic data from the storage device. Further, for example, the information processing apparatus 100 may output the audio playback data to an audio apparatus (not illustrated) configured to be connectable to the information processing apparatus 100, and the audio apparatus may output the acoustic signal based on the audio playback data to the reproduction unit 120. The information processing apparatus 100 may include the reproduction unit 120.

[Operation of Information Processing Apparatus]

Figure 2:
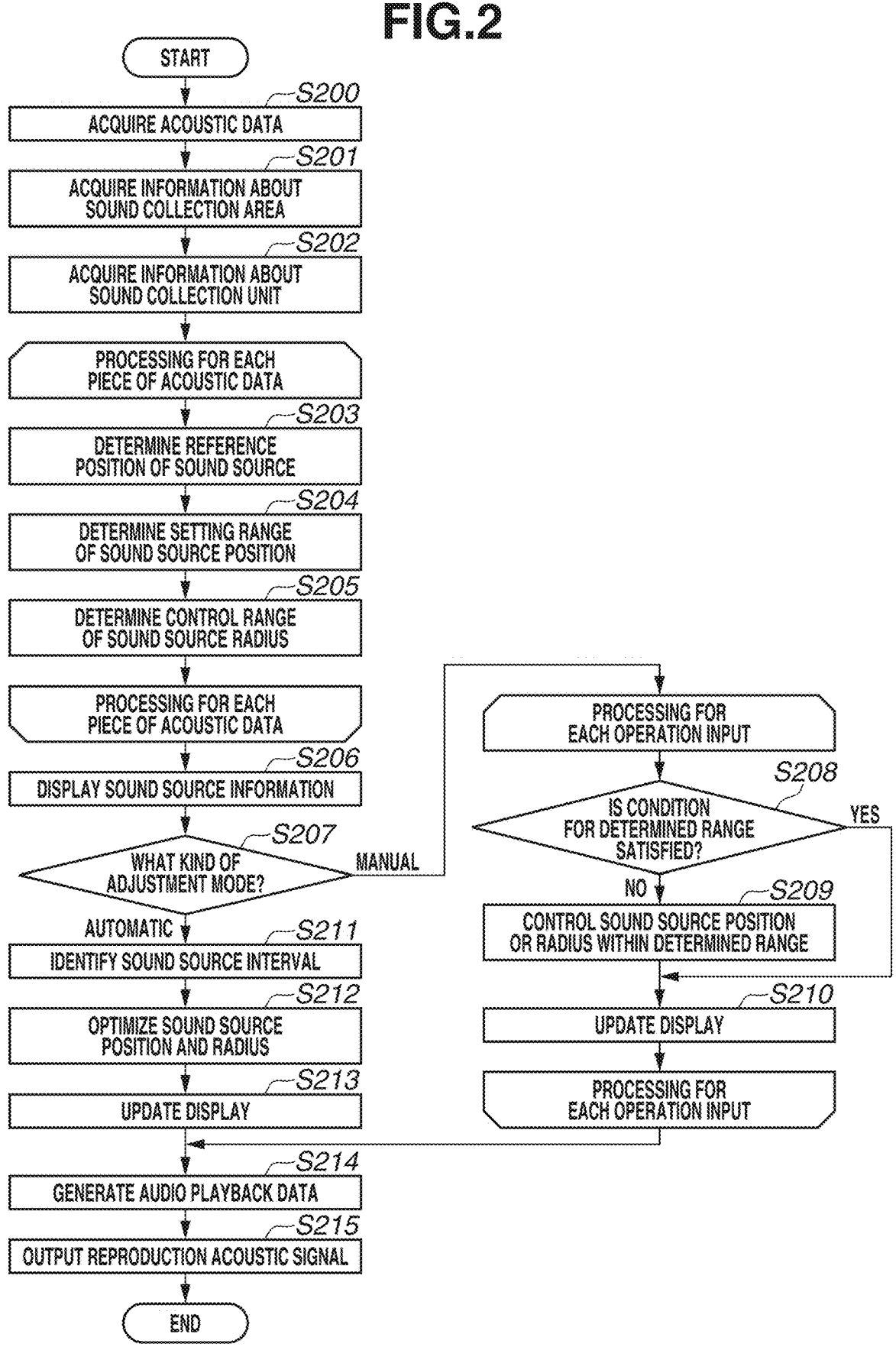
FIG. 2 is a flowchart illustrating an operation example of the information processing apparatus.

An operation example of the information processing apparatus 100 according to the present exemplary embodiment will be described below with reference to a flowchart illustrated in FIG. 2. Processing illustrated in FIG. 2 is started at a timing when the sound collection signal is input to the information processing apparatus 100 and the information processing apparatus 100 receives an instruction for starting processing for generating audio playback data. The instruction for starting the processing may be performed by a user operation via the operation unit 506 of the information processing apparatus 100, or the instruction may be input from another apparatus. The timing when the processing illustrated in FIG. 2 is executed is not limited to the above-described timing.

The processing illustrated in FIG. 2 may be executed in parallel with sound collection performed by the sound collection units 110, or may be executed after the sound collection performed by the sound collection units 110 is completed. The processing illustrated in FIG. 2 is implemented in such a manner that the CPU 501 loads a program stored in the ROM 502 into the RAM 503 and executes the program. At least a part of the processing illustrated in FIG. 2 may be implemented by one or more pieces of dedicated hardware different from the CPU 501.

Figure 3A:
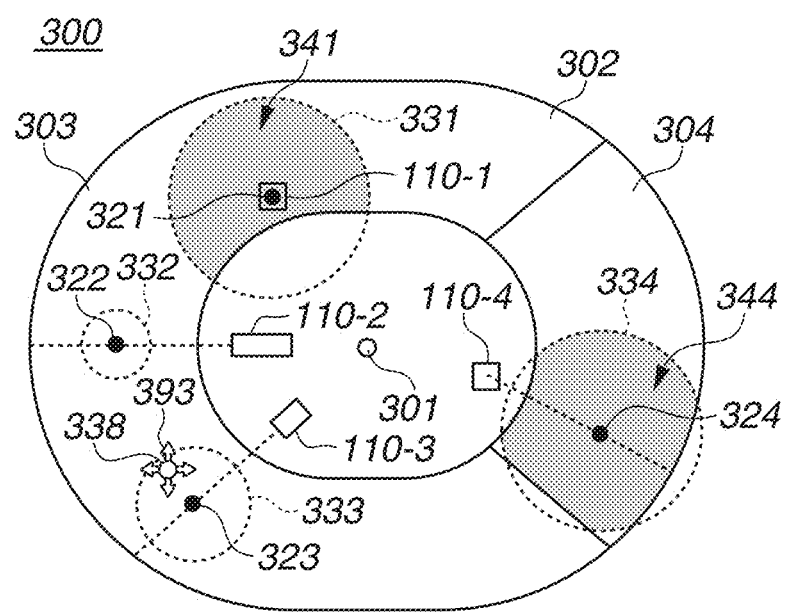
FIGS. 3A and 3B are diagrams each illustrating a setting of a position and radius of each sound source.

In step S200, the input unit 103 receives an input from each of the plurality of sound collection units 110, and acquires a plurality of pieces of acoustic data based on sound collection performed by the plurality of sound collection units 110 configured to collect a sound at different positions. In step S201, the signal processing unit 102 acquires information about target sound collection areas from which sounds are collected by the plurality of sound collection units 110. In the present exemplary embodiment, the sounds to be collected by the sound collection units 110 are sounds from the spectator stand in the stadium, and geometric information, such as the position and shape of a spectator stand area 302 of a stadium 300 illustrated in FIG. 3A, is acquired as information about the sound collection area. The information about the sound collection areas may include geometric information about a home-side area 303 and an away-side area 304, which are included in the spectator stand area 302.

The information about the sound collection area is preliminarily stored in the storage unit 101. However, the information about the sound collection area may be input to the information processing apparatus 100 by a user operation via the operation unit 506. The information processing apparatus 100 may acquire the information about the sound collection area by analyzing a video signal acquired from an image capturing unit (camera) (not illustrated) which captures an image of the entire stadium. In this case, the home-side area 303 and the away-side area 304 may be identified based on, for example, the color of a uniform worn by each audience member.

In step S202, the signal processing unit 102 acquires information about the plurality of sound collection units 110. The information about the sound collection units 110 includes information indicating at least the position of each sound collection unit 110. The information about the sound collection units 110 may also include information about a type indicating whether each sound collection unit 110 has a directivity, an orientation direction of each sound collection unit 110 and the level of the directivity if the corresponding sound collection unit 110 has a directivity.

The position and orientation direction of each sound collection unit 110 are described in a coordinate system corresponding to the information about the sound collection area acquired in step S201. For example, an origin of a global coordinate system is set at a center 301 of the stadium which is the space in which the plurality of sound collection units 110 is located. In the coordinate system, an x-axis is set to be parallel to a linear portion of the spectator stand area 302, a y-axis is set to be vertical to the linear portion of the spectator stand area 302, and a z-axis is set in a vertical direction that is vertical to the x-axis and the y-axis. The position and orientation direction of each sound collection unit 110 are represented by coordinate values in the coordinate system defined as described above. However, the format of each of the information about the sound collection area and the information about the plurality of sound collection units 110 is not limited to this example.

The information about the plurality of sound collection units 110 is preliminarily stored in the storage unit 101. However, the information about the plurality of sound collection units 110 may be input to the signal processing unit 102 by a user operation via the operation unit 506. The signal processing unit 102 may acquire the information about the plurality of sound collection units 110 by analyzing the video signal acquired by the image capturing unit (not illustrated) and detecting the sound collection units 110. In this case, the video signal may be analyzed based on a result of learning performed in advance using various video images obtained from the sound collection units 110. The signal processing unit 102 may directly acquire the information about the plurality of sound collection units 110 from the respective sound collection units 110. In this case, each sound collection unit 110 may output information about a position and direction acquired. using a global positioning system (GPS) or an orientation sensor.

Processing of steps S203 to S205 is executed on each of the plurality of pieces of acoustic data, acquired in step S200, corresponding to a different one of the plurality of sound collection units 110. The processing is repeatedly executed by changing the acoustic data to be processed. Alternatively, the processing for the plurality of pieces of acoustic data may be executed in parallel.

The subsequent processing is performed by setting virtual sound sources respectively corresponding to the plurality of pieces of acoustic data. Specifically, a sound collected by a single sound collection unit 110 is processed as a sound to be output from a single sound source in the sound collection area. For example, the sound collection unit 110-1, which is a non-directional microphone as illustrated in FIG. 3A, collects a sound that is output in an area around the sound collection unit 110-1 and reaches the sound collection unit 110-1, and the information processing apparatus 100 processes the sound collected by the sound collection unit 110-1 as the sound output from a virtual sound source present at a position 321. The position of the sound source is used to generate the audio playback data for achieving the stereophonic effect. In other words, in the processing to be described below, the information processing apparatus 100 processes the acoustic data, which is obtained based on sound collection performed by the sound collection units 110, based on the position of the sound source corresponding to the acoustic data and the virtual listening position, generating the audio playback data for reproducing a sound depending on the listening position. The virtual listening position can be set, for example, at the center of a stadium, and the listening position can be changed.

In step S203, the signal processing unit 102 determines a reference position as a sound collection position for the sound source to be associated with the acoustic data based on the position of the sound collection unit 110 used to acquire target acoustic data. For example, in a case where the target acoustic data is acquired by the sound collection unit 110-1, the reference position to be associated with the acoustic data corresponds to the position 321 that matches the position where the sound collection unit 110-1 is installed. On the other hand, in a case where the target acoustic data is acquired by the sound collection unit 110-2, which is a microphone array, the reference position to be associated with the acoustic data corresponds to a position 322 that is located in the spectator stand area 302 and is away from the position where the microphone array 110-2 is installed in the orientation direction of the microphone array 110-2. The sound collection unit 110-2 is a microphone that can form the directivity by signal processing and can extract a sound in a specific orientation direction from the collected sound by signal processing.

In a case where the target acoustic data is acquired by the sound collection unit 110-3, which is a directional microphone, the reference position set as the sound collection position to be associated with the acoustic data corresponds to a position 323 that is located in the spectator stand area 302 and is away from the position where the sound collection unit 110-3 is installed. In a case where the target acoustic data is acquired by the sound collection unit 110-4, which is a non-directional microphone and is located outside the spectator stand area 302, the position where the sound collection unit 110-4 is installed is outside the spectator stand area 302 which is a predetermined sound collection target area. Accordingly, the reference position to be associated with the acoustic data corresponds to the position 323 that is located in the spectator stand area 302 and is located on a line connecting the position where the sound collection unit 110-4 is installed and a position closest to the sound collection unit 110-4 within the spectator stand area 302. The method of determining the reference position described above is merely an example, and is not limited to this example.

In step S204, the signal processing unit 102 determines a setting range representing a range (a range in which a sound source position can be set) in which the position of the sound source can be changed from the reference position based on the reference position of the sound source determined in step S203. The setting range includes the reference position. For example, the reference position corresponds to the center of the setting range. In the present exemplary embodiment, the setting range is set, for example, for the following purpose. The information processing apparatus 100 can change the position of the sound source from the reference position. Thus, in the audio playback data generated by the processing to be described below based on the position of the sound source, an imbalance in a cheering sound or the like due to an imbalance in the sound collection positions can be reduced. However, if the position of the sound source can be freely moved from the reference position to improve the balance of the sound from all around the stadium, the difference between the position where the sound is actually output and the set sound source position increases, which may cause the user to feel strangeness in the reproduced sound.

In particular, in an example where a sound is collected from the spectator stand area of the stadium, a local sound (in the present exemplary embodiment, the sound is expressed as "a sound with a high locality"), such as a cheering sound including a sound of musical performance using an instrument, is collected, if the position where the sound is heard is greatly changed, the user feels strangeness more likely. An effect of the change of the position of the sound source corresponding to a sound with a high locality on the space reproducibility in a sound field is more likely to be perceived by the user when a sound to be heard at a certain viewpoint position set as a virtual listening position is reproduced at the same time when a video image viewed from the viewpoint position is reproduced. The setting range is set to suppress a decrease in realistic feeling provided by the reproduced sound.

In order to suppress a feeling of strangeness caused due to a change in the position of the sound source while reducing an imbalance of sounds, the signal processing unit 102 determines the setting range in such a manner that a movable amount from the reference position is small for the sound source corresponding to a sound with a higher locality. As a criterion for determining the locality, for example, the level of the directivity, which is a feature of each sound collection unit 110, can be used. Specifically, the signal processing unit 102 sets the setting range for the sound source corresponding to target acoustic data to be smaller as the sound collection unit 110 used to acquire the target acoustic data has a high directivity. This is because the sound collection unit 110 having a high directivity is used in many cases to collect a sound with a high locality. A sound from a direction other than the orientation direction is less likely to be mixed in the sound collected by the sound collection unit 110 having a high directivity. Accordingly, a characteristic sound different from a sound collected by the other sound collection units 110 can be collected by the sound collection unit 110 having a high directivity in many cases.

In an example illustrated in FIG. 3A, as the setting range for the sound source corresponding to the acoustic data acquired by the sound collection unit 110-1, a setting range 331 in which the sound source position can be greatly changed from the reference position 321 is set. Similarly, a wide setting range 334 is set as the setting range for the sound source corresponding to the acoustic data acquired by the sound collection unit 110-4. Meanwhile, as the setting range for the sound source corresponding to the acoustic data acquired by the sound collection unit 110-3, which has a relatively low directivity, a setting range 333, which is smaller than each of the setting range 331 and the setting range 334, is set. Further, as the setting range for the sound source corresponding to the acoustic data acquired by the sound collection unit 110-2, which has a relatively low directivity, a setting range 332 which is smaller than the setting range 333, is set.

The exemplary embodiment described above illustrates an example where the directivity is used as a feature of each of the sound collection units 110. However, the feature to be used is not limited to this example. Features such as the width of a range in which a sound can be collected by each of the sound collection units 110 may be used. The criteria for determining the locality for determining the setting range is not limited to the above-described example, and a feature amount obtained by analyzing acoustic data may be used as the criterion for determination. Examples of the feature amount of acoustic data include correlation information indicating a correlation coefficient, a cosine similarity, or the like between the target acoustic data and another piece of acoustic data acquired by another sound collection unit 110. In the case of using a correlation coefficient, it is preferable to calculate the correlation coefficient based on a delay correction amount corresponding to a maximum cross-correlation function so that an effect of a propagation delay of a sound appearing each piece of acoustic data can be corrected. The setting range for the sound source corresponding to the acoustic data can be reduced as an average value of correlation coefficients with other pieces of acoustic data decreases, or as the correlation with other sound sources is lower.

As the correlation information, a feature amount, such as a mel-frequency cepstral coefficient (MFCC), may be calculated from each piece of acoustic data, and the plurality of pieces of acoustic data may be classified into a plurality of groups (feature amount clusters) by a known clustering technique. The signal processing unit 102 may determine a position range corresponding to each group, and may determine the setting range for the sound source corresponding to each piece of acoustic data to be a range corresponding to a group to which the acoustic data belongs (cluster to which the sound source belongs). FIG. 4A illustrates an example where eight sound sources are clustered in four clusters. In the example illustrated in FIG. 4A, the reference positions of sound sources belonging to the same cluster are represented by the same figure. Specifically, sound sources respectively located at reference positions 411, 412, and 413, each of which is represented by a black circle, belong to a first cluster, and a sound source located at a reference position 414, which is represented by a black star, belongs to a second cluster. Sound sources respectively located at reference positions 415 and 416, each of which is represented by a black triangle, belong to a third cluster, and sound sources respectively located at reference positions 417 and 418, each of which is represented by a black rhombus, belong to a fourth cluster.

For example, as a boundary between the setting range for the sound sources belonging to the first cluster and the setting range for the sound source belonging to the second cluster, a boundary 421 is determined. The boundary 421 is drawn from the center 301 of the stadium between the reference position 413 belonging to the adjacent cluster and the sound source located at the reference position 414. In this case, the boundary 421 may be moved toward the reference position 414 of the sound source with a higher locality as schematically indicated by a bidirectional arrow 422 so that the sound source that belongs to a cluster in which the number of sound sources is smaller has a higher locality and the setting range for the cluster is decreased. Since the reference positions 411, 412, and 413 are located in the home-side area 303 of the spectator stand area 302, the setting range for the sound sources belonging to the first cluster may be limited to the inside of the home-side area 303. Under these conditions, the setting range for the sound sources belonging to the first cluster is determined to be a setting range 423 which is colored in gray and includes the reference positions 411, 412, and 413.

Similarly, based on a boundary 424 and the home-side area 303, the setting range for the sound sources belonging to the third cluster is determined to be a setting range 426 which is colored in gray and includes the reference positions 415 and 416. A setting range 427 corresponding to an area between the setting range 423 and the setting range 426 in the home-side area 303 is determined to be the setting range for the sound source belonging to the second cluster. A setting range 428 for the sound sources belonging to the fourth cluster matches the away-side area 304 including the reference positions 417 and 418.

Like in the examples of the home-side area 303 and the away-side area 304 described above, the setting range for each sound source can be limited based on information about divided areas obtained by preliminarily dividing the space of the sound collection target. With this configuration, a feeling of strangeness by the user, such as a phenomenon in which a fight song sung by the audience in the home-side area is heard from the away-side area, in a case where a sound is reproduced based on the audio playback data can be reduced or prevented. The limitation of the setting range can also be applied to a case where the setting range for each sound source is determined based on the directivity of each sound collection unit 110. In the example illustrated in FIG. 3A, a setting range 341, which is colored in gray, is obtained by limiting the setting range 331 for the sound source located at the reference position 321 to the inside of the home-side area 303. Similarly, a setting range 344 colored in gray is obtained by limiting the setting range 334 for the sound source located at a reference position 324 to the inside of the away-side area 304.

In the example described above, the setting range for each sound source corresponding to the target acoustic data is determined based on one of the feature of the acoustic data and the feature of each sound collection unit 110 associated with the acquisition of the acoustic data. However, the feature based on which the setting range is determined is not limited to this example. The setting range may be determined based on both the feature of the acoustic data and the feature of each sound collection unit 110.

In step S205 illustrated in FIG. 2, a control range for a sound source radius based on which the signal processing unit 102 controls spreading of sound corresponding to target acoustic data is determined based on at least one of the feature of the acoustic data and the feature of each sound collection unit 110. Controlling the spreading of sound refers to processing in which a sound source signal is distributed to speakers in a wide angle range by a known panning technique, such as Multiple-Direction Amplitude Panning (MDAP), in the case of generating a surround reproduction signal. The use of MDAP can cause the user who listens to the reproduced sound to feel wide spreading of the sound from a single sound source than in the case of using Vector Base Amplitude Panning (VBAP). Accordingly, in a case where a sound, such as a cheering sound in the stadium, which is actually output from audience members located at plurality of positions (sound from an astigmatic sound source), is processed as a single sound source, a feeling of strangeness by the user in the reproduced sound can be reduced by increasing the spreading degree of sound.

In the present exemplary embodiment, the spreading of sound perceived by the user who listens to the reproduced sound varies based on the sound source radius set by the signal processing unit 102. For example, in a case where the audio playback data is generated using the center 301 of the stadium as the virtual listening position, a visual angle formed when the sound source having a size determined based on the sound source radius corresponding to the target acoustic data is viewed from the center 301 is calculated. Further, the sound source signal corresponding to the target acoustic data is distributed to speakers in the angle range corresponding to the visual angle, and accordingly spreading of sound can be controlled.

In the above described manner, the range of a direction in which no sound source is present as viewed from the virtual listening position can be narrowed by controlling not only the sound source position but also the sound source radius. This leads to an improvement in the balance of the sound from all over the stadium. However, like in the case of controlling the sound source position, if the difference between the range of the position where a sound is actually output in the space of the sound collection target and the set sound source radius is large, the user may feel strangeness in the reproduced sound. To prevent such a feeling of strangeness by the user, the signal processing unit 102 determines the control range in which the sound source radius can be changed.

For example, as a method for determining the control range, the signal processing unit 102 determines the control range in such a manner that the sound source radius is decreased for the sound source corresponding to a sound with a higher locality. For example, the control range is determined in such a manner that the sound source radius corresponding to acoustic data is decreased as the directivity of the sound collection unit 110 used to acquire the acoustic data is higher. This is because it is highly likely that a sound collected with a high directivity is output from a position within a narrow range. On the contrary, it is highly likely that a sound collected with a low directivity is output from a position within a wide range. Accordingly, if the directivity of the sound collection unit 110 used to acquire the acoustic data is low, or if the sound collection unit 110 is a non-directional sound collection unit, the control range is set in such a manner that the sound source radius corresponding to the acoustic data is increased so that the broadening of sound in reproduction can be expressed.

Figure 3B:
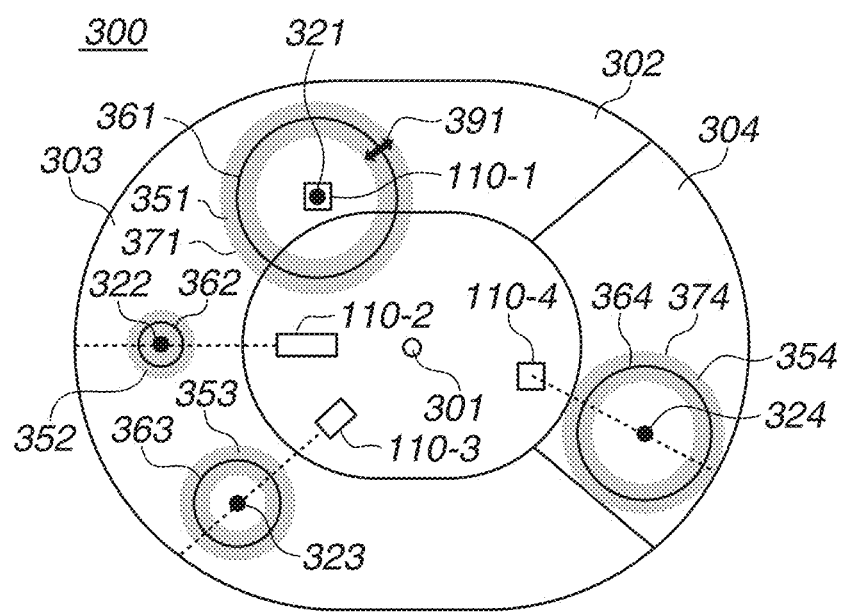

FIG. 3B illustrates an example of controlling the sound source radius. For the sound source corresponding to the acoustic data acquired by the sound collection unit 110-1, a control range 351 which is colored in gray and has a large sound source radius is set with the position 321 of the sound source as a center. A sound source radius corresponding to an intermediate point of the control range 351 is set as a reference radius 361. The reference radius 361 is an initial value of the sound source radius. The sound source radius can be changed from the reference radius 361 within the control range 351. In step S204 described above, a case where the setting range for the sound source position is limited to the inside of the home-side area 303 or the inside of the away-side area 304 is described by way of example. However, the control range for the sound source radius may also be limited in the same manner as described above. For example, the control range 351 may be determined in such a manner that a ratio of a portion corresponding to the outside of the home-side area 303 in a circle having a maximum sound source radius 371 included in the control range 351 is less than or equal to a predetermined value (e.g., 20%).

For the sound source corresponding to the acoustic data acquired by the sound collection unit 110-4, a control range 354, which is colored in gray, is set with the position 324 of the sound source as a center, and a sound source radius corresponding to an intermediate point of the control range 354 is set as a reference radius 364. In an example illustrated in FIG. 3B, the entire circle having a maximum sound source radius 374 included in the control range 354 is limited to the inside of the away-side area 304. By determining the control range 354 as described above, a feeling of strangeness by the user, such as a phenomenon in which a fight song sung by the audience in the away-side area is spread and heard from the audience in the home-side area, can be reduced or prevented when a sound is reproduced based on the audio playback data.

For the sound source corresponding to the acoustic data acquired by the sound collection unit 110-3 having a low directivity, a control range 353, which is colored in gray and has a medium-size sound source radius, is set with the position 323 of the sound source as a center. A sound source radius corresponding to an intermediate point of the control range 353 is set as a reference radius 363. Meanwhile, for the sound source corresponding to the acoustic data acquired by the sound collection unit 110-2 having a high directivity, a control range 352, which is colored in gray and has a small sound source radius, is set with the position 322 of the sound source as a center. A sound source radius corresponding to an intermediate point of the control range 352 is set as a reference radius 362. The size of a sound source radius set in the control range 352 may be "0". Since the control range for each sound source radius is set with the sound source position as a center, if the sound source position is changed from the reference position, the control range for the sound source radius is set with the changed sound source position as a center.

Like in the case of determining the setting range for the sound source position, also in the case of determining the control range for the sound source radius, the locality of acoustic data may be used. For example, the control range may be determined in such a manner that the sound source radius corresponding to acoustic data is decreased as the locality corresponding to the degree of correlation between the target acoustic data and another piece of acoustic data increases.

In step S206, the display control unit 104 generates images based on the information about each sound source, such as images as illustrated in FIGS. 3A and 4A, which indicate the reference position and setting range of each sound source, or an image as illustrated in FIG. 3B, which indicates the reference radius and control range of each sound source, and causes the display unit 505 to display the generated images. On a display as illustrated in FIG. 4A, the position and setting range of each sound source may be displayed in such a manner that the clusters to which the sound sources belong are displayed in colors different from each other. Further, the home-side area 303 and the away-side area 304 may be displayed in colors different from each other. The contents of the display by the display control unit 104 are not limited to examples illustrated in FIGS. 3A and 3B and FIGS. 4A, 4B, and 4C, as long as information based on which at least one of the setting range and the control range of each sound source can be identified is displayed.

In step S207, a setting of an adjustment mode for adjusting the sound source position and the sound source radius is determined. In a case where a manual mode is set as the adjustment mode ("MANUAL" in step S207), the processing proceeds to step S208. In a case where an automatic mode is set as the adjustment mode ("AUTOMATIC" in step S207), the processing proceeds to step S211. The setting of the adjustment mode is performed based on a user operation performed on the information processing apparatus 100. Alternatively, the information processing apparatus 100 may set the adjustment mode based on information such as the number, type, or the like of the sound collection units 110.

Processing of steps S208 to S210 is executed on each input corresponding to a user operation detected by the operation detection unit 105. Specifically, when a plurality of operations is performed by the user, the processing of steps S208 to S210 is repeated the number of operations. In step S208, the operation detection unit 105 determines the sound source designated by the user operation and contents of a change instruction for the sound source. The contents of the change instruction for the sound source indicate a change of the sound source position or a change of the sound source radius. Further, the signal processing unit 102 determines whether the change instruction for the sound source position or the sound source radius based on the user operation satisfies the condition for the setting range set in step S204 and the control range set in step S205. In a case where the condition, such as the condition in which an input corresponding to a user operation for designating a position within the setting range as a new sound source position is received, is satisfied (YES in step S208), the signal processing unit 102 sets the position or radius of the sound source depending on the input, and then the processing proceeds to step S210. On the other hand, in a case where the condition is not satisfied (NO in step S208), the processing proceeds to step S209.

In step S209, the signal processing unit 102 controls the position or radius of the sound source to satisfy the above-described condition. For example, if the change instruction based on the user operation indicates that the position of the sound source is moved to the outside of the setting range, the signal processing unit 102 moves the sound source position to the boundary of the setting range. Similarly, if the change instruction based on the user operation indicates that the radius of the sound source is changed to a size that is outside the control range, the signal processing unit 102 changes the sound source radius to the boundary (a maximum radius or a minimum radius) of the control range. However, the change instruction is not limited to the examples described above. If the change instruction based on the user operation does not satisfy the condition for the setting range or the control range, the signal processing unit 102 may not receive the change instruction and may not change the position and radius of the sound source. As a result of processing of steps S208 and S209, the sound source position corresponding to the target acoustic data is set within the setting range determined in step S204. The sound source radius corresponding to the target acoustic data is set within the control range determined in step S205.

In step S210, the display control unit 104 updates the display associated with the position and radius of the sound source. For example, as illustrated in FIG. 3A, if the position of the sound source is changed from the reference position 323 to a position 383, the changed sound source position 383 and a cross arrow 393 indicating movable directions are displayed. In this case, if the changed sound source position 383 is close to the boundary of the setting range 333, at least one of the sound source position 383, the setting range 333, and the cross arrow 393 may be highlighted by changing a display color or a line width of at least one of the sound source position 383, the setting range 333, and the cross arrow 393, or by blinking the display thereof. In the cross arrow 393, only arrows indicating directions away from the boundary of the setting range 333 may be displayed, or the arrows may be displayed in a relatively large size.

For example, as illustrated in FIG. 3B, when the radius of the sound source is changed from the reference radius 361, a direction in which the sound source radius can be adjusted is displayed as indicated by a bidirectional arrow 391. In this case, if the changed sound source radius is close to the boundary of the control range 351, at least one of the sound source radius, the control range 351, and the bidirectional arrow 391 may be highlighted by changing a display color or a line width of at least one of the sound source radius, the control range 351, and the bidirectional arrow 391, or by blinking the display thereof As for the bidirectional arrow 391, only arrow indicating directions away from the boundary of the control range 351 may be displayed, or the arrows may be displayed in a relatively large size. If the input corresponding to the user operation does not satisfy the condition for the setting range or the control range, the display control unit 104 may display information indicating that the input corresponding to the user operation does not satisfy the condition for the setting range or the control range, or may display an error.

As described above, the position and radius of the sound source in response to the user operation is adjusted in the manual mode under the condition for the setting range and the control range, and accordingly a sound can be adjusted as intended by the user while a feeling of strangeness by the user in the reproduced sound is reduced or prevented. Meanwhile, according to the adjustment in the automatic mode to be described below, quantification is performed on the balance of sounds from all over the stadium and a constraint and an evaluation function are determined, and accordingly the position and radius of each sound source can be optimized while time and labor for the user operation is saved.

In step S211, the signal processing unit 102 identities an interval between the sound sources each corresponding to a different one f the plurality of pieces of acoustic data as an index indicating the balance of the sound all around the stadium. Specifically, as illustrated in FIG. 4B, tangential lines are drawn from the virtual listening position (the center 301 of the stadium in an example illustrated in FIG. 4B) to the sound sources which are located at the positions 411 to 418 and have sound source radii 431 to 438, respectively, and an angle formed between adjacent tangential lines is set as a sound source interval $\theta$. For example, the sound source interval between the sound source which is located at the position 411 and has the sound source radius 431 and the sound source which is located at the reference position 412 and has the sound source radius 432 is represented by $\theta 12$. If the circles corresponding to the sound source radii overlap each other, like in the sound source which is located at the reference position 412 and has the sound source radius 432 and the sound source which is located at the reference position 413 and has the sound source radius 433, a sound source interval $\theta 23$ is represented by a negative value.

In this case, if the sound source interval, such as $\theta 12$ or $\theta 56$, is large, the sound in the direction corresponding to the sound source interval is not reproduced, which leads to imbalance in the sound from all over the stadium and a sound surround effect in the sound field cannot be fully produced. If the sound source interval is a negative value having a large absolute value, sounds from a plurality of different sound sources are reproduced from substantially the same direction. Accordingly, also in this case, imbalance occurs in the sound of all the stadium and a direction sense of the sound field cannot be fully obtained. For this reason, the signal processing unit 102 sets the sound. source position and the sound source radius in such a manner that the interval between the plurality of sound sources corresponding to the plurality of pieces of acoustic data falls within a predetermined range. Specifically, the sound source interval $\theta$ is used as an index indicating the balance of the sound from all over the stadium, and $\theta L \leq \theta \leq \theta H$ is set as a preferable range of the sound source interval $\theta$. Thus, when $\theta < \theta L$, it can be determined that the direction sense of the sound field is not sufficient, and when $\theta < \theta H$, it can be determined that the sound surround effect in the sound field is not sufficient. A certain amount of overlapping of the circles corresponding to the sound source radii of the sound sources may be permitted and a negative value may be set for $\theta L$.

In step S212, the signal processing unit 102 formulates and solves an optimization problem using the sound source position and the sound source radius as optimization variables, to optimize the sound source position and the sound source radius. First, as constraints for the position and radius of the sound source, a constraint (3) "$\theta L \leq \theta i < \theta H$ (i=1 to N)" for improving the balance of the sound from all over the stadium is imposed in addition to a condition (1) for the setting range set in step S204 and a condition (2) for the control range set in step S205. In the constraint (3), $\theta i$ represents the sound source interval between adjacent sound sources and is represented by sound source position and sound source radius functions, and N represents the number of sound sources.

Next, the evaluation function to be minimized corresponds to the sum of movement amounts from the reference positions of the respective sound sources. This is because, if the constraint is satisfied, the user feels strangeness less likely when the movement amount from the reference position of each sound source is small. In this case, it is desirable to set a weighting coefficient for the movement amount in such a manner that the value of the weighting coefficient increases as the sound source has a higher locality so that the movement amount from the reference position can be reduced for the sound source having a higher locality, and it is also preferable to use the sum of weighted movement amounts. For the same purpose as described above, the sum of normalized movement amounts obtained by normalizing the movement amount with, for example, the size of the setting range may be used.

The signal processing unit 102 may adjust θL and θH in the constraint (3) based on the input corresponding to the user operation detected by the operation detection unit 105. Accordingly, for example, the user can emphasize the direction sense of the sound field by setting θH to be closer to θL, or can emphasize the sound surround effect in the sound field by setting θL to be closer to θH.

The signal processing unit 102 solves the optimization problem as described above, to optimize the position and radius of all sound sources. The above-described optimization processing is merely an example. The signal processing unit 102 may automatically control the position and radius of each sound source by another method. Alternatively, the signal processing unit 102 may control the position and radius of sound sources selected from among the plurality of sound sources, instead of controlling all the sound sources. Using processing of steps S211 and S212, the sound source position corresponding to the target acoustic data is set within the setting range determined in step S204. Further, the sound source radius corresponding to the target acoustic data is set within the control range determined in step S205.

In step S213, the display control unit 104 updates the display associated with the position and radius of each sound source. For example, as illustrated in FIG. 4B, the sound sources which are located at the reference positions 411 to 418 and have the sound source radii 431 to 438, respectively, before optimization correspond to the sound sources which are located at sound source positions 441 to 448 and have sound source radii 451 to 458, respectively, after optimization. In the setting of the sound sources before optimization as illustrated in FIG. 4B, the sound source intervals θ12 and θ56 and a sound source interval θ78 are larger than θH and the sound source interval θ23 (<0) is smaller than θL, Accordingly, the constraint (3) described in step S212 is not satisfied. Meanwhile, in the setting of the sound sources after optimization as illustrated in FIG. 4C, the position and radius of each sound source are controlled as described below, so that all sound source intervals, including sound source intervals θ'12, θ23, θ'56, and θ'78, fall within the range of θL to θH. In other words, an imbalance in the arrangement of the sound sources after optimization is smaller than imbalance (imbalance of reference positions) the arrangement of the sound sources before optimization.

First, the sound sources which are located at the reference positions 441 to 413 and have the reference radii 431 to 433, respectively, in FIG. 49 are moved to the sound source positions 441 to 443, respectively, in FIG. 4C, and correspond to the sound sources having the sound source radii 451 to 453, respectively. These sound sources have large reference radii 431 to 433, respectively, and correspond to a sound with a low locality. Accordingly, the space between the circle corresponding to each reference radius and the boundary of the home-side area 303 is narrow, which makes it difficult to fill the sound source interval θ12 by increasing the sound source radius. Accordingly, the positions of these sound sources are changed so that the sound source intervals θ'12 and θ23 satisfy the constraint.

The sound source which is located at the reference position 414 and has the reference radius 434 in FIG. 4B corresponds to a sound with a high locality and thus is not suitable for greatly changing the sound source radius and the sound source position. For this reason, the position and radius of each sound source illustrated in FIG. 4C are maintained in the state illustrated in FIG. 4B. Specifically, a sound source position 444 and a sound source radius 454 illustrated in FIG. 4C are respectively identical to the reference position 414 and the reference radius 434 illustrated in FIG. 4B.

The sound sources which are located at the reference positions 415 and 416 and have the reference radii 435 and 436, respectively, in FIG. 4B are moved to sound source positions 445 and 446, respectively, in FIG. 4C, and correspond to the sound sources having sound source radii 455 and 456, respectively. There is an interval between the circles corresponding to the reference radii 435 and 436 of the sound sources and the boundary of the home-side area 303. Accordingly, the size of each of the sound source radii 455 and 456 illustrated in FIG. 4C is greater than the size of each of the reference radii 435 and 436 illustrated in FIG. 4B. In other words, the sound source position and the sound source radius for these sound sources are controlled so that the sound source interval θ'56 satisfies the constraint.

Further, the sound sources which are located at the reference positions 417 and 418 and have the reference radii 437 and 438, respectively, in FIG. 4B correspond to the sound sources which are located at the sound source positions 447 and 448 and have the sound source radii 457 and 458, respectively, in FIG. 4C. In this case, there is an interval between the circles corresponding to the reference radii 437 and 438 and the boundary of the away-side area 304. Accordingly, the size of each of the sound source radii 457 and 458 illustrated in FIG. 4C is greater than the size of each of the reference radii 437 and 438 illustrated in FIG. 4B. Meanwhile, the sound source positions 447 and 448 in FIG. 4C are maintained at the reference positions 417 and 418, respectively, in FIG. 4B. In other words, the sound source radius for these sound sources is controlled so that the sound source interval θ'78 satisfies the constraint.

The adjustment in the manual mode and the adjustment in the automatic mode as described above may be combined. For example, for sound sources other than the sound sources for which the sound source radius and the sound source position are changed in response to the user operation, the sound source position and the radius may be sequentially optimized in the automatic mode. Further, the adjustment processing in the manual mode (processing of steps S208 to S210) may be performed after the adjustment processing in the automatic mode (processing of steps S211 to S213) is performed.

In step S214, the signal processing unit 102 acquires information indicating the virtual listening position and listening direction in the space in which the plurality of sound collection units 110 is located. The listening position and listening direction are determined based on a user operation detected by the operation detection unit 105. That is, the user can arbitrarily designate the virtual listening position and listening direction in the sound collection target space. At least one of the listening position and the listening direction may be determined to be a predetermined position and direction independently of the user operation. For example, the listening position may be determined to be the center of the stadium, and the listening direction may be determined to be a direction from the center of the stadium to a main stand. The information processing apparatus 100 may acquire information for determining the listening position and the listening direction from an external apparatus. For example, the information processing apparatus 100 may acquire viewpoint information indicating a position and direction of a viewpoint associated with video data to be reproduced together with audio playback data, and may determine a position and direction of a listening point based on the viewpoint information.

The signal processing unit 102 generates the audio playback data by processing the acoustic data acquired by the sound collection units 110 based on information about the sound source position and sound source radius set as described above and the virtual listening position and listening direction. Accordingly, the audio playback data for reproducing a sound based on the virtual listening position and listening direction can be obtained. Specifically, based on the direction and visual angle of each sound source with respect to the listening position and listening direction, acoustic data based on sound collection is processed by a known panning technique, such as MDAP, to generate surround reproduction data. The signal processing unit 102 may generate data for binauralized headphone reproduction by applying a head-related transfer function. (HRTF) to the surround reproduction data.

To generate the audio playback data, at least one of the plurality of pieces of acoustic data selected based on the virtual listening position and listening direction from among the plurality of pieces of acoustic data acquired by the plurality of sound collection units 110 included in the information processing system 10 may be used. According to this method, the amount of data to be processed by the information processing apparatus 100 can be reduced. However, the audio playback data may be generated using all the plurality of pieces of acquired acoustic data. In step S215, the output unit 106 outputs the reproduction acoustic signal based on the audio playback data generated in step S214 to the reproduction unit 120.

The processing illustrated in FIG. 2 has been described above. The exemplary embodiment described above illustrates an example where both the position of each sound source and the radius of each sound source are controlled. However, the information processing apparatus 100 may control only one of the position of each sound source and the radius of each sound source. To facilitate understanding of the description, the exemplary embodiment described above illustrates an example whether the position and radius of each sound source are two-dimensionally controlled. However, the present exemplary embodiment is also applicable to a case where the position and radius of each sound source are three-dimensionally controlled. For example, the information processing apparatus 100 may control the position of each sound source in a height direction. In this case, the setting range in which the sound source position can be changed may also be set three-dimensionally. Further, each sound source is represented by a sphere having a sound source radius.

As described above, the information processing apparatus 100 according to the present exemplary embodiment acquires a plurality of pieces of acoustic data based on sound collection performed by the plurality of sound collection units 110 configured to collect a sound at different positions. Further, the information processing apparatus 100 sets the virtual sound source position corresponding to the acoustic data within the setting range determined based on at least one of the feature of the acoustic data and the feature of each sound collection unit 110 associated with the acquisition of the acoustic data and the position of the sound collection unit 110. The information processing apparatus 100 processes at least one of the plurality of acquired pieces of acoustic data based on the sound source position and the virtual listening position set for each of the at least one of the plurality of pieces of acoustic data. By the processing described above, audio playback data for reproducing a sound based on the listening position is generated.

According to the configuration described above, the realistic feeling provided to the user by the reproduced sound based on the audio playback data generated from the acoustic data obtained by collecting a sound at a plurality of positions can be increased. For example, by the sound reproduction based on the audio playback data generated as described above, an imbalance in sounds can be reduced and a sound surround effect can be provided to the user, while a feeling of strangeness due to a phenomenon in which a local sound is heard from a direction different from the direction in the environment in which the sound is actually collected is reduced or prevented.

In the present exemplary embodiment, the acoustic data acquired in step S200 is data based on sound collection performed by the sound collection unit 110. However, acoustic data generated by a computer may be used instead of acoustic data on the sound actually collected. In this case, the position of the sound source corresponding to the acoustic data is set based on, for example, a user operation.

According to the exemplary embodiments described above, it is possible to increase a realistic feeling provided to a user by a reproduced sound based on audio playback data generated from acoustic data obtained by collecting a sound at a plurality of positions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the scope of the present disclosure is not limited to the particular disclosed exemplary embodiments. The scope of the following claims is to be accorded the broadest interpretation so as to encompass all such modifications and equivalent structures and functions.

This application claims the benefit of Japanese Patent Application No. 2019-064366, filed Mar. 28, 2019, which is hereby incorporated by reference herein in its entirety.

What is claimed is:

1. An information processing apparatus comprising:
a data acquisition unit configured to acquire a plurality of pieces of acoustic data based on sound collection performed by a plurality of sound collection units each configured to collect a sound at a different position;
a setting unit configured to set a virtual sound source position corresponding to a piece of acoustic data acquired by the data acquisition unit, based on a sound collection position of a sound collection unit for acquiring the piece of acoustic data and correlation information indicating a correlation between the piece of acoustic data and another piece of acoustic data, the virtual sound source position set such that an imbalance between a plurality of virtual sound source positions respectively corresponding to the plurality of pieces of acoustic data is smaller than an imbalance between sound collection positions of the plurality of sound collection units; and
a generation unit configured to generate audio playback data tor reproducing a sound for a virtual listening position, by processing at least one of the plurality of pieces of acoustic data acquired by the data acquisition unit based on the virtual listening position and the virtual sound source position set for each of the at least one of the plurality of pieces of acoustic data by the setting unit.

2. The information processing apparatus according to claim 1, further comprising:
a determination unit configured to determine a setting range for setting the virtual sound source position corresponding to each of the plurality of pieces of acoustic data, based on the correlation information about the plurality of pieces of acoustic data acquired by the data acquisition unit and the sound collection positions of the sound collection units associated with the acquisition of the acoustic data,
wherein the setting unit sets the virtual sound source position corresponding to each of the plurality of pieces of acoustic data acquired by the data acquisition unit within the setting range determined for the acoustic data by the determination unit.

3. The information processing apparatus according to claim 2, wherein the setting range determined by the determination unit for the plurality of pieces of acoustic data acquired by the data acquisition unit includes the sound collection positions of the sound collection units associated with the acquisition of the acoustic data.

4. The information processing apparatus according to claim 3, wherein each of the sound collection positions of the sound collection units is a position where each of the sound collection units is installed and a position away from the position where each of the sound collection units is installed in an orientation direction of the sound collection unit.

5. The information processing apparatus according to claim 3, wherein each of the sound collection positions of the sound collection units is installed on a line connecting a position where each of the sound collection units is installed and a position closest to the sound collection unit in a predetermined sound collection target area.

6. The information processing apparatus according to claim 2, further comprising:
a display control unit configured to cause a display unit to display information based on which the setting range determined by the determination unit is identified; and
a reception unit configured to receive an input corresponding to a user operation for designating a position within the setting range determined by the determination unit,
wherein the setting unit sets, based on the input received by the reception unit, the virtual sound source position corresponding to each of the plurality of pieces of acoustic data acquired by the data acquisition unit.

7. The information processing apparatus according to claim 2, wherein in a case where sound locality indicated by the correlation information about first acoustic data acquired by the data acquisition unit is higher than sound locality indicated by the correlation information about second acoustic data acquired by the data acquisition unit, the determination unit determines the setting range such that a setting range corresponding to the first acoustic data is smaller than a setting range corresponding to the second acoustic data.

8. The information processing apparatus according to claim 2, wherein the determination unit determines position ranges each corresponding to a different one of a plurality of groups into which the plurality of pieces of acoustic data is classified, and determines the setting range corresponding to each of the plurality of pieces of acoustic data acquired by the data acquisition unit to be a position range for each of the groups into which the acoustic data belongs.

9. The information processing apparatus according to claim 1, wherein the correlation information about the plurality of pieces of acoustic data acquired by the data acquisition unit indicates at least one of a correlation coefficient, a cosine similarity, and a mel-frequency cepstral coefficient based on a correlation between the acoustic data and another piece of acoustic data.

10. The information processing apparatus claim 1, further comprising:
a determination unit configured to determine a setting range for setting the virtual sound source position corresponding to each of the plurality of pieces of acoustic data, based on a position of a sound collection unit and a directivity of the sound collection unit associated with the acquisition of the acoustic data acquired by the data acquisition unit,
wherein the setting unit sets the virtual sound source position corresponding to each of the plurality of pieces of acoustic data acquired by the data acquisition unit within the setting range determined for the acoustic data by the determination unit.

11. The information processing apparatus according to claim 10, wherein in a case where directivity of a sound collection unit associated with acquisition of first acoustic data acquired by the data acquisition unit is higher than directivity of a sound collection unit associated with acquisition of second acoustic data acquired by the data acquisition unit, the determination unit determines the setting range such that a setting range corresponding to the first acoustic data is smaller than a setting range corresponding to the second acoustic data.

12. The information processing apparatus according to claim 1,
wherein the setting unit sets a spreading of sound corresponding to each of the plurality of pieces of acoustic data acquired by the data acquisition unit, based on at least one of the correlation information about the acoustic data and a directivity of each of the sound collection units associated with the acquisition of the acoustic data, and
wherein the generation unit generates the audio playback data by processing the at least one of the plurality of pieces of acoustic data based on the spreading of sound and the virtual sound source position set for each of the at least one of the plurality of pieces of acoustic data by the setting unit.

13. The information processing apparatus according to claim 12, wherein in a case where a sound locality indicated by the correlation information about third acoustic data acquired by the data acquisition unit is higher than a sound locality indicated by the correlation information about fourth acoustic data acquired by the data acquisition unit, the setting unit sets the spreading of sound such that spreading of sound corresponding to the third acoustic data is smaller than spreading of sound corresponding to the fourth acoustic data.

14. The information processing apparatus according to claim 12, wherein in a case where directivity of the sound collection unit associated with acquisition of third acoustic data acquired by the data acquisition unit is higher than directivity the sound collection unit associated with acquisition of fourth acoustic data acquired by the data acquisition unit, the setting unit sets the spreading of sound such that spreading of sound corresponding to the third acoustic data is greater than spreading of sound corresponding to the fourth acoustic data.

15. The information processing apparatus according to claim 1, wherein the setting unit sets at least one of a position and a spreading of sound of each of a plurality of virtual sound sources such that an interval between two adjacent virtual sound sources among the plurality of virtual sound sources respectively corresponding to the plurality of pieces of acoustic data falls within a predetermined range.

16. The information processing apparatus according to claim 15, wherein the setting unit sets at least one of the position and the spreading of sound of each of the plurality of virtual sound sources such that a movement amount of the position of each of the plurality of virtual sound sources is minimized under a condition that the interval between two adjacent virtual sound sources falls within the predetermined range.

17. An information processing method comprising:
acquiring a plurality of pieces of acoustic data based on sound collection performed by a plurality of sound collection units each configured to collect a sound at a different position;
setting a virtual sound source position corresponding to a piece of acquired acoustic data, based on a sound collection position of a sound collection unit for acquiring the piece of acoustic data and correlation information indicating a correlation between the piece of acoustic data, the virtual sound source position set such that an imbalance between a plurality of virtual sound source positions respectively corresponding to the plurality of pieces of acoustic data is smaller than an imbalance between sound collection positions of the plurality of sound collection units; and
generating audio playback data for reproducing a sound for a virtual listening position, by processing at least one of the plurality of pieces of acquired acoustic data based on the virtual listening position and the virtual sound source position set for each of the at least one of the plurality of pieces of acoustic data.

18. The information processing method according to claim 17, further comprising:
determining a setting range for setting the virtual sound source position corresponding to each of the plurality of pieces of acoustic data, based on the correlation information about the plurality of pieces of acquired acoustic data and the sound collection positions of the sound collection units associated with the acquisition of the acoustic data,
wherein the virtual sound source position corresponding to each of the plurality of pieces of acquired acoustic data is set within the setting range determined for the acoustic data.

19. A non-transitory computer-readable storage medium storing a program for causing a computer to execute an information processing method, the information processing method comprising:
acquiring a plurality of pieces of acoustic data based on sound collection performed by a plurality of sound collection units each configured to collect a sound at a different position;
setting a virtual sound source position corresponding to a piece of acquired acoustic data, based on a sound collection position of a sound collection unit for acquiring the piece of acoustic data and correlation information indicating a correlation between the piece of acoustic data and another piece of acoustic data, the virtual sound source position set such that an imbalance between a plurality of virtual sound source positions respectively corresponding to the plurality of pieces of acoustic data is smaller than an imbalance between sound collection positions of the plurality of sound collection units; and
generating audio playback data for reproducing a sound for a virtual listening position, by processing at least one of the plurality of pieces of acquired acoustic data based on the virtual listening position and the virtual sound source position set for each of the at least one of the plurality of pieces of acoustic data.

* * * * *